July 3, 1951            B. D. MILLER            2,559,129
METHOD AND APPARATUS FOR REMOVING GASEOUS AND
READILY VAPORIZABLE MATERIALS FROM LIQUIDS
Filed Feb. 21, 1946            3 Sheets-Sheet 1

INVENTOR.
Bruce D. Miller
BY
Charles J. Campbell
ATTORNEY

July 3, 1951 B. D. MILLER 2,559,129
METHOD AND APPARATUS FOR REMOVING GASEOUS AND
READILY VAPORIZABLE MATERIALS FROM LIQUIDS
Filed Feb. 21, 1946 3 Sheets-Sheet 3

INVENTOR.
Bruce D. Miller
BY
Charles J. Campbell
ATTORNEY

Patented July 3, 1951

2,559,129

UNITED STATES PATENT OFFICE 2,559,129

METHOD AND APPARATUS FOR REMOVING GASEOUS AND READILY VAPORIZABLE MATERIALS FROM LIQUIDS

Bruce D. Miller, Louisville, Ky., assignor to The Girdler Corporation, Louisville, Ky., a corporation of Delaware Application February 21, 1946, Serial No. 649,301

6 Claims. (Cl. 261—21).

The present invention relates to gas and liquid contact treatment, and more particularly to an improved method and apparatus for removing gaseous, readily vaporizable or volatile materials from liquids.

The invention is adapted for employment throughout the broad field of gas and liquid contact treatment and among the specific applications are deaeration of liquids, removal of garlic and other odors from milk, deodorizing of animal and vegetable oils, removal of absorbed gases from liquid chemical absorbents, and removal of undesired glycerides from fats. As a specific example chosen only for purposes of detailed disclosure, however, the invention is described hereinafter as employed in the deodorization of edible oils and using an inert gaseous stripping medium such as steam, nitrogen or other gas which can be moved at high velocities.

An important object of the invention is to provide an improved continuous process and apparatus for removing gaseous and readily vaporizable materials from liquids.

Another important object of the invention is to provide an improved, highly efficient and economical gas and liquid contact arrangement in which the liquid to be treated moves alternately in film and spray forms through the contact zone while being subjected to extremely effective contact with a rapidly moving gaseous stripping medium.

Another important object is to provide a highly efficient gas and liquid contact arrangement in which the rapidly moving gaseous stripping medium moves through the contact zone with substantially undiminished pressure.

Another object is to provide an improved gas and liquid contact arrangement in which the actions of centrifugal force and gravity are utilized to facilitate movement of the liquid through the contact zone, effect contact of the stripping medium alternately with films and sprays of the liquid, increase the interfacial contact between the liquid and stripping medium, and cause scrubbing of the liquid films by streams of the stripping medium moving rapidly in contact therewith.

Still another object is to provide an arrangement in which the stripping medium is heated so as to afford the required heat for treatment of the liquid without the necessity for supplemental heating in the contact zone.

A further object is to provide a simple and efficient apparatus in which great economy in the use of the heated stripping medium may be attained due to recycling part of the liquid under treatment, to maintenance of a constantly high volume ratio of stripping medium to liquid in contact therewith, and to reduction of the partial pressures of gases and volatiles being removed from the liquid under vacuum.

Still another object is to provide a treating zone in which a high vacuum may be used as needed and in which the pressure drop of the gaseous stripping medium passing therethrough is so low as to be substantially negligible.

In accomplishing all of its objectives the invention thus employs a series of mutually coordinated steps of heat transfer, spray and film contact, changes of flow ranging through violent to gentle movements, maintenance of efficient pressures, temperatures and durations of treatment in the several steps, recycling of the liquid under treatment and segregation of portions of the liquid in accordance with its state of treatment. However, it will become apparent as the description proceeds that some of the objectives of the invention may be attained by the employment of only a few of these specified steps.

In carrying out the present invention the liquid to be treated may advantageously be heated by heat transfer with the treated liquid and thereafter receive further heat to bring it to the temperature at which it is to enter the gas and liquid contact zone. I prefer to conduct these heating operations at subatmospheric pressures so that air, and at least some other gases and volatile materials may be removed from the liquid before their normally deleterious effects are produced. The liquid so pretreated then is brought into intimate contact with a heated gaseous stripping medium which by its mode of contact with the liquid not only effects the complete removal of the undesired constituents of the liquid, but also accomplishes this without the necessity of supplemental heating in the contact zone.

The heated gaseous stripping medium is passed through the contact zone with a centrifugal whirling action in contact with the liquid and with a substantially negligible pressure drop as it moves through said zone. Novel construction features of the apparatus make possible the use of spray, film and atomized forms of gas and liquid contact within the zone and insure efficient separation of the liquid and gaseous contents of the zone adjacent the outlet for the gas. After the desired treatment is accomplished the liquid is separately led from the zone back into heat exchange relation with incoming liquid and the gaseous and readily vaporizable materials are led from the zone to a suitable point of disposal.

Numerous objects and advantages in addition to those enumerated above will be apparent from the following description taken in conjunction with the appended drawings in which:

Figure 5 is a section taken through the helical baffle in the contact unit at the point where it joins the inner shell of the unit and located between the top and bottom of the unit;

Figure 6 is a view similar to Figure 5 but taken on the helical baffle adjacent the liquid discharge point into the inner shell;

Figure 7 is a section on line 7—7 of Figure 5.

When the invention is employed for the deodorizing of edible oils using steam as a stripping medium, as well as for the agitating and heating of the oil to be subjected to that stripping medium, the efficient use of such steam assumes significant commercial importance. As is well known in the art, the mere preheating of the incoming oil by heat exchange with the outgoing deodorized oil, and preliminary deaeration and removal of undesired readily vaporizable constituents prior to raising the temperature of such oil to a point where oxidization is likely to occur, are advantageous and therefore are incorporated into the apparatus shown. Other novel expedients, however, for preparing the oil for contact with the stripping medium and for insuring the most efficient use of the stripping medium and for production of a superior oil product will become more apparent as the description proceeds.

Figure 1:
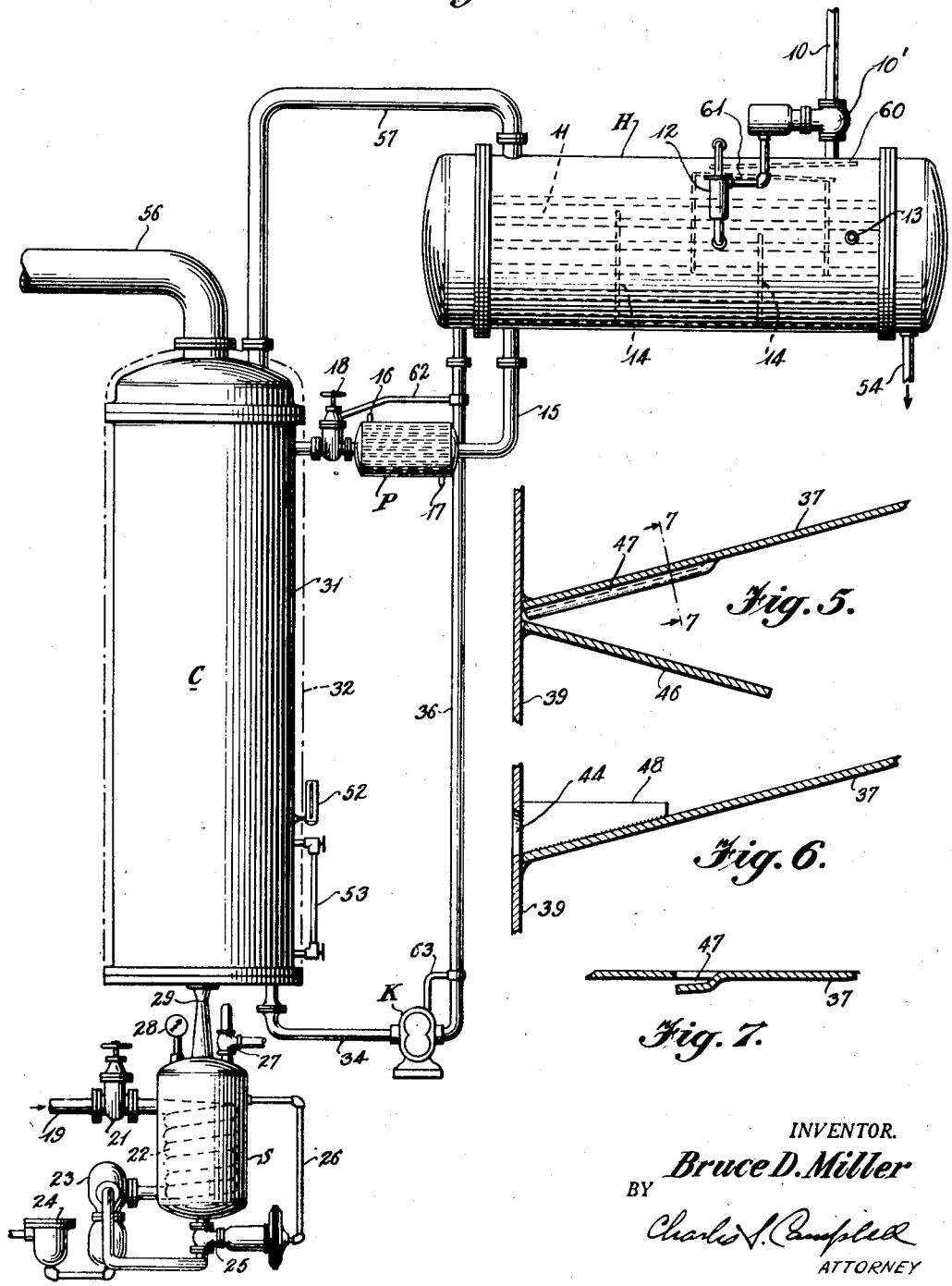
Figure 1 is a view in elevation showing one arrangement of apparatus embodying the invention.

Referring now to Figure 1, the liquid to be treated, such as edible oil in this chosen illustration, enters heat exchanger H through pipe 10 and valve 10¹ and flows downward across plates 60 and 61 into the space surrounding tubes 11 in the conventional shell and tube type of heat exchanger. It will be understood that any other suitable type of heat exchanger may be used or that this type of heat exchanger mounted in vertical rather than horizontal manner may be used, if desired. A liquid level controller 12, cooperating with valve 10¹, maintains the level of the oil above the uppermost tubes in the exchanger H so that the maximum heat transfer is obtained and the oil surrounding the tubes has no opportunity to cook thereon. Through pipe 13 live steam is introduced into heat exchanger H beneath the level of oil therein and co-mingles with and agitates the oil, assisted by the baffles 14 around which the mixture of oil and steam moves in passing through the heat exchanger. In addition to supplementing the preliminary heating action and causing turbulence in the oil, a portion of this steam contacts the incoming oil dripping from plates 60 and 61 and flowing as a film along those plates. As a result of these combined actions the steam in passing to outlet 57, the importance of which will later be disclosed, carries with it air, as well as some of the other gases and more readily vaporizable materials usually found in such oils; for example, those materials which if not removed will cause rapid deterioration, high smoke points or otherwise adversely affect the color, taste or characteristics of the final product made from the oil. Thus, in the heat exchanger, and before heating of the oil to the higher temperatures required in the later treatment, there is effected a preliminary deaeration so as to avoid danger of later oxidation of the oil at the higher temperatures. Also there is effected a preliminary removal of some of the more readily vaporizable materials in the oil so as to lessen the burden on, and render more effective, the subsequent treatment in the contact zone later to be described.

After receiving this preliminary treatment, the oil then flows through pipe 15 to preheater P, which may be of any conventional type heated by an efficient heat exchange medium, for example steam, entering through either pipe 16 or 17 and leaving through the other. The oil while passing through preheater P, is heated to the desired treating temperature which in the case of certain edible oils may be in the range of 300°-450° F. In addition, it is contemplated that in the treatment of some liquids it may be advantageous to have the hot liquid issue from the preheater into the contact zone along with entrained gaseous stripping medium and in such cases steam or other inert gas may be added to the liquid either by introduction into pipe 15 or preheater P through any suitable means not shown. Such an entrained medium also would serve a useful agitating purpose as the oil and medium passes through the preheater P. After receiving the desired treatment in the preheater the oil then passes by way of valve 18 to the primary gas and liquid contact unit C which preferably is maintained under a high vacuum (in the order of one-half millimeter of mercury absolute pressure). It will be understood that the invention is not limited to any particular temperatures or degrees of vacuum, since such operating conditions may vary as will be understood by those skilled in the art, depending upon the characteristics of the particular liquid being treated and upon the results desired.

Figure 2:
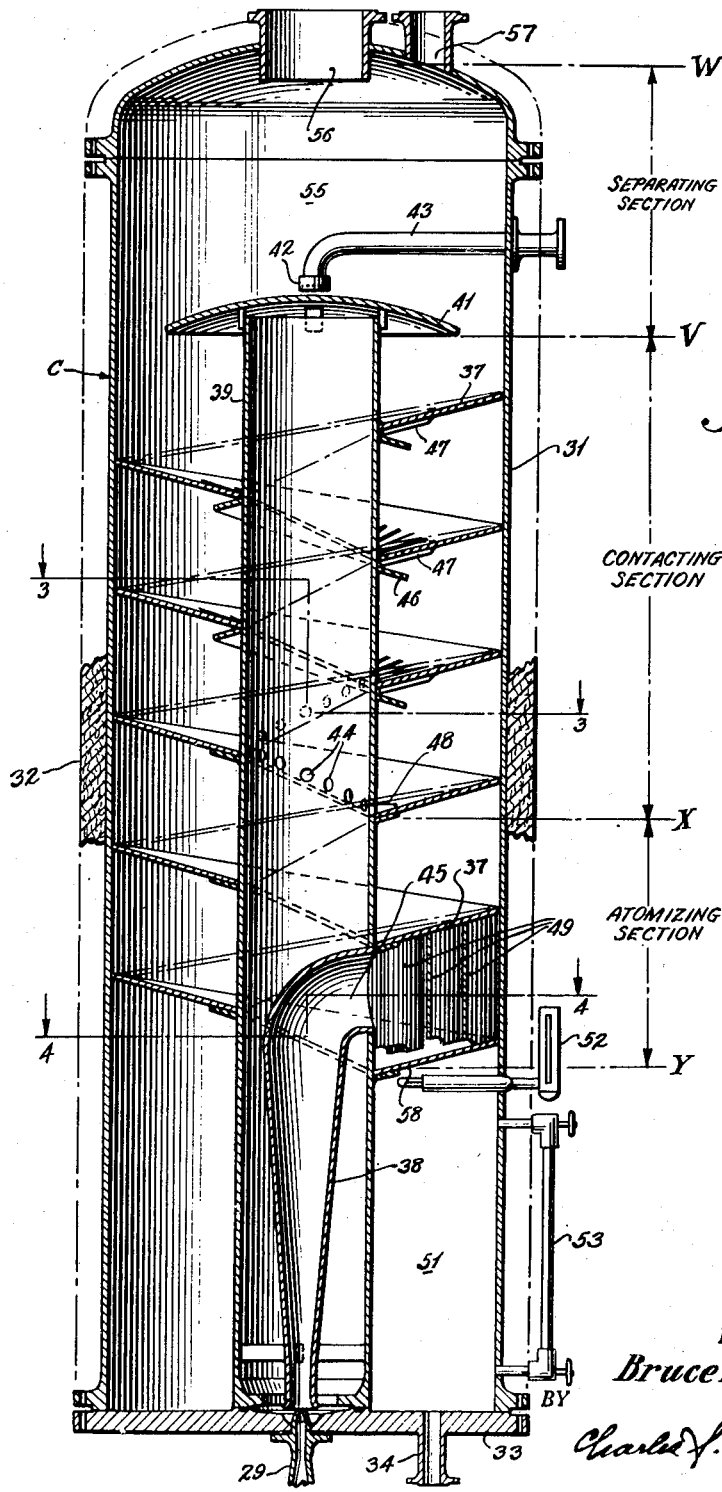
Figure 2 is a vertical central section through one embodiment of a gas and liquid contact unit in which my process may be employed.

Referring now to Figure 2, the preheated oil enters unit C through pipe 43 and is discharged in spray form by nozzle head 42 onto the upper surface of plate 41. This oil, now to be subjected to violent turbulent action in the unit C, moves as a film to the edge of plate 41 and falls from the plate by gravity, whereupon it is caught in a rapidly whirling stream of superheated steam, serving as a heated gaseous stripping medium, and is promptly broken up into a finely divided spray and then dashed against the outer shell 31 of the contact unit due to the centrifugal force imparted to the oil particles by the rapidly whirling stream. Upon meeting shell 31 the oil then reforms as a film and moves by gravity downward along wall 31 and inwardly along baffle 37 to the baffle openings 47 best shown in Figures 5 and 7. The downwardly flowing films of oil on shell 31 and baffle 37 are also subjected to a constant scouring action by the stream of steam flowing rapidly upward in the helical passage defined by baffle 37. The heated and partially stripped oil then drops through openings 47 onto skirt 46 extending outwardly from inner shell 39 of the unit C. Again moving as a film, the oil drops from the depending edge of skirt 46 and once more is broken up into a spray and dashed against outer shell 31, but at a lower level than before. Due to the centrifugal force imparted to the oil by the rapidly whirling stream of steam and to the action of gravity, the oil continues in its downward path alternately in contact as a film and as a spray with the stripping medium, and constantly under the high vacuum and at a high temperature, until it reaches discharge apertures 44 located in the inner shell 39 at a point below which the helical skirt 46 has terminated and at a point below which the helical baffle 37 is solid and has no apertures 47. Adjacent the lowermost aperture 44 a small dam element 48 is provided to insure diversion into the inner shell 39 of all oil reaching the dam.

Figure 4:
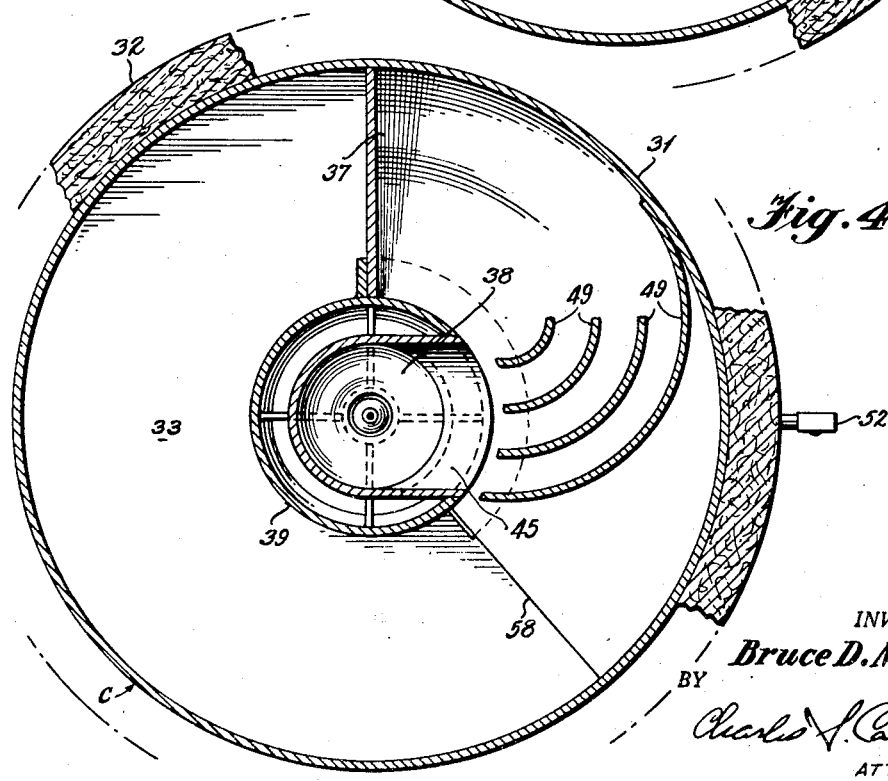
Figure 4 is a horizontal section on line 4—4 of Figure 2.

Upon passing through apertures 44, the oil, still subject to the high vacuum (since the interior of shell 39 is in open communication with the outer large space of unit C under the plate 41) flows downwardly and upon reaching the bottom of the inner shell 39 is entrained, through the cooperative action of nozzle 29 and ejector 38, with the incoming superheated steam. This mixing of stripping medium and oil results in the oil being atomized in finely divided form and in this extremely fine form while subject to heat and high vacuum, it is moved upwardly through the expanding portion of the ejector, passes through opening 45 in the inner shell 39, is diverted by fixed, curved vanes 49, best shown in Figures 2 and 4, and starts moving rapidly upward in a helical path confined by helical baffle 37, inner shell 39 and outer shell 31.

Figure 3:
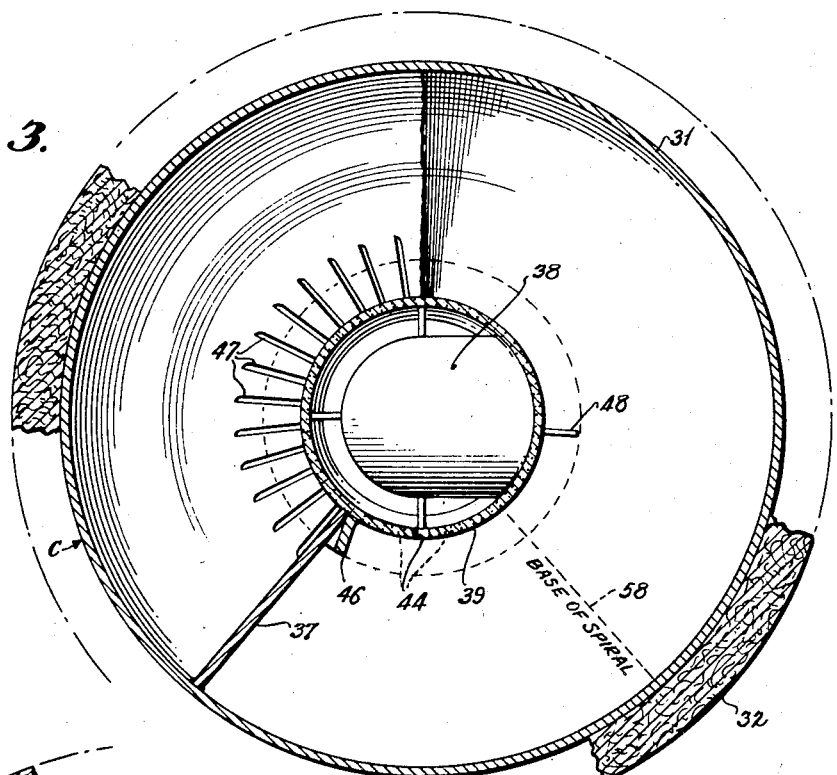
Figure 3 is a horizontal section on line 3—3 of Figure 2.

Once again the oil in spray form is impinged against outer shell 31 due to centrifugal force and subsequently reforms as a film and flows downwardly over shell 31 and baffle 37. Any oil forming as a film and flowing downwardly before it reaches the portion of baffle 37 in which apertures 44 are located, will continue to flow downwardly in a helical path and will drop from the lower edge 58 of baffle 37, shown in Figures 3 and 4, and collect in a sump 51 at the bottom of the contact unit C. As will be noted, this sump is subjected to the high vacuum obtaining in the unit C, but the hot stripping medium is not in contact with the pool of liquid collected in the sump. Especially will it be noted that none of the stripping medium is required to pass through the oil in the sump 51 or through any other pool of oil in the contact unit. This is an important advantage, in that the heat of the stripping medium is not dissipated by transfer to a liquid which no longer requires heating; in that the pressure of the stripping medium is not diminished by having to pass through a hydrostatic head of liquid; and in that the velocity of a moving body of stripping medium entering the contact zone is not impaired by entrainment of liquid which has already been fully treated.

With further reference to oil which does not deposit as a film and drain into sump 51 immediately, such oil entrained with the stripping medium in ejector 38 and depositing as a film after reaching a portion of baffle 37 above apertures 44 will therefore be recycled through the same path as before. This recycling step is important in the treating of the more difficult liquids to deodorize, but on the other hand in the treating of some liquids wherein the desired results can be attained by a single pass through the contact unit the apparatus could be reconstructed to omit the recycling step without diminishing the value of the other features of my invention. Generally a high volume ratio of stripping medium to liquid under treatment is desirable since in this way the liquid can be maintained at its initial high temperature without supplementary heating means in the contact zone and at the same time the kinetic energy of the stripping medium can be utilized most effectively in entraining liquid, dashing liquid against the shell and scouring the surface of the liquid film. As will be apparent the location of apertures 44 along the length of inner shell 39, the volume of liquid entering through pipe 43 and the volume, pressure and temperature of steam entering through nozzle 29 contribute to the efficiency of the recycling feature of the invention and may be widely varied without departing from the scope of the same.

The heated and deodorized oil collecting in sump 51 is moved by pump K through pipes 34 and 36 into the tube section of heat exchanger H whereupon it gives up its heat to the incoming oil and then passes out through pipe 54. As previously indicated, it is preferable in the carrying out of my invention, to maintain a high vacuum for prompt removal of deleterious constituents of the liquid being treated as well as removal of the steam or other stripping medium. The interior of contact unit C may be maintained at such high vacuum by means of suitable evacuating means, not shown, connected to vapor discharge line 56. The end of line 56 terminates below the top of unit C at a location where the stripping medium and volatile materials can be drawn therein without carrying with them any liquid or liquid mist. Due to the efficient whirling action of the stripping medium and the differences of specific gravity of such medium and the liquid spray treated at the top of the contact unit, a rapid separation of gas and liquid occurs in the unit within the space lying between lines V and W shown in Figure 2. Through connecting pipe 57 the high vacuum is constantly imposed on the body of liquid in heat exchanger H and the gases and vaporizable materials from the incoming liquid as well as the steam introduced through pipe 13 are thus readily evacuated from the system. The high vacuum moreover is effective upon the liquid within preheater P and should steam or other stripping and agitating medium be introduced into the liquid therein, as previously suggested, such gases and volatile materials from the liquid would immediately be evacuated into line 56 upon leaving spray head 42. Since the vacuum from unit C also has its effect on the seals or glands of pump K and valve 18, Figure 1, a bypass 63 from pressure line 36 to the gland of pump K and a bypass 62 from line 36 to the gland of valve 18 are provided to insure against air leaking into the oil lines at these points. In this way any oil that leaks through such glands is retained in the system without loss while simultaneously sealing the system against air leakage thereinto.

Referring now to Figures 1 and 2, the important action of the stripping medium may be noted. Although superheated steam is preferably employed when treating edible oils, it will be obvious that saturated steam, nitrogen or other inert gases may be used without departing from the invention. As illustrated, saturated steam at relatively high pressure enters pipe 19, passes through shutoff valve 21, coil 22, separator 23 and pressure regulating valve 25. Upon expansion from valve 25 this steam, dropping to a lower pressure, is superheated and passes through the chamber of superheater S where it receives heat from heat exchange with the incoming saturated steam in coil 22. The connected steam trap 24 provides for removal of condensate from the superheater coil while a differential pressure connection 26 serves to control the pressure in the superheater chamber S and safety valve 27 and pressure gauge 28, of conventional designs, perform their customary functions. The hot superheated steam passes through nozzle 29 at high velocity and enters ejector 38, meanwhile entraining partially treated liquid from the interior of shell 39 as above described. Contact unit C is provided with heavy insulation 32 to minimize heat loss and is supplied with a conventional thermometer 52 and sight glass 53 serving to indicate the temperature of oil and its level in sump 51. Whereas the prior art has generally taught that supplementary heating in the contact zone is necessary to keep the temperature of the liquid to be treated at a high value, and that the stripping medium alone was inadequate for this purpose, my invention makes possible the omission of any such additional heat source. It has been found that by proper design and control the heat carrying stripping medium alone can maintain the high temperature of the liquid introduced through pipe 43 during its period of contact with the medium.

The preferred construction of contact unit C employs a path for the travel of the stripping medium having a uniform cross section so that there are no pressure differences due to contraction or expansion of the medium while following the path. This is accomplished by use of the concentric inner shell 39 and outer shell 31 and uniform spacing of the turns of helical baffle 37. By reason of this and the maintenance of a uniform vacuum throughout the entire inner spaces of contact unit C, no impedance is presented to the rush of the stripping medium through its confined helical path. As it expands through ejector 38 and is directed by curved vanes 49 into its intended helical path, the hot, rapidly moving stream of stripping medium imparts a high centrifugal force to any liquid entrained therein and this tends to throw the liquid against the outermost shell 31 and then to cause scouring of the surface of any liquid film trickling down the wall of shell 31. Also the rapidly whirling stream of stripping medium breaks up into small particles any liquid dropping from skirt 46. The intimate contact thus established between gas and liquid insures efficient heat transfer as well as rapid volatilization and stripping of all undesired volatile materials in the liquid. The extremity efficient interfacial contact between gas and liquid insures that maximum use is made of the heat carried by the stripping medium and results in a uniformly deodorized final oil product.

As the stripping medium moves upwardly in its helical path it passes through various stages which for convenience may be described respectively as the atomizing, contacting and separating sections of the apparatus, designated generally as lying between the lines Y and X, X and V and V and W respectively. It will be understood that these terms, however, are to be broadly interpreted since some atomization, some contacting and some separating may easily occur in other sections of the apparatus.

Referring to Figure 2, the stripping medium with entrained liquid in atomized form, and which liquid already has passed at least once through the contacting section, enters into the contacting section as soon as it rises above the lowermost aperture 44 in baffle 37. Any liquid deposited out of the stream of stripping medium after reaching this point will thereafter be compelled to pass into the atomizing section again. After passing from the uppermost end of baffle 37 and above the edge of plate 41, from which the incoming oil is dripping, the medium with rapidly swirling action enters the separating section. Here the entrained liquid is separated primarily by centrifugal force and by its difference in specific gravity from that of the stripping medium. Thereafter the separated oil returns to the contacting section to meet more stripping medium while the previously separated stripping medium passes through outlet 56 carrying with it the gases and vaporizable undesired materials taken from the liquid.

As will be apparent to those skilled in the art, many of the objectives of the invention can be secured through concurrent flow of stripping medium and liquid through contact unit C, as for example by reversing the general locations of nozzle 29 and outlet 56 and by employment of suitable means to lift liquid while in the contact unit. Therefore, although the preferred form of my invention teaches countercurrent flow I do not mean to be limited thereto except as defined by the appended claims.

In addition to the advantages resulting from segregation of pools of liquid from the path of gaseous stripping medium as above outlined, it is found that the novel apparatus herein disclosed is completely self-cleaning and that the user may quickly shift from the treatment of one type of liquid to the treatment of another without having to clean the system or having to handle a mixture of liquids. The small dam 48 is adjacent the lowermost aperture 44 so that no pool of liquid can form above the dam after the supply of incoming liquid is terminated.

Having thus described my invention, I claim:

1. Apparatus for removing gaseous or readily vaporizable materials from a liquid including, a treating chamber adapted to contain a liquid and having an inner shell and an outer shell concentrically disposed to provide an annular space therebetween, a baffle positioned between the shells defining a confined path for flow of a gaseous stripping medium and a liquid in contact with each other, means for draining the liquid from said baffle into the interior of said inner shell to temporarily segregate said liquid out of contact with the medium, means for entraining the segregated liquid with the stripping medium for further contact with the medium, a sump in said chamber, means for draining the entrained liquid into said sump, and means for removing the gaseous and vaporizable materials from said chamber along with the stripping medium.

2. Apparatus for removing gaseous or readily vaporizable materials from a liquid including, a treating chamber adapted to contain a liquid and having an inner shell and an outer shell concentrically disposed to provide an annular space therebetween, a helical baffle positioned between said shells defining a helical path of flow for a gaseous stripping medium through the chamber in scouring contact with the liquid and providing spaced apart sections along a substantial length of the chamber, apertures in said baffle permitting the liquid to move from one section to another section while out of contact with the baffle surface, means for introducing a gaseous stripping medium at high velocity into the helical path, means for draining the liquid from said baffle into the interior of said inner shell to temporarily segregate said liquid out of contact with the medium, means for entraining the segregated liquid with the stripping medium entering the helical path for further contact with the medium, a sump in said chamber, means for draining the entrained liquid into said sump, and means for removing the gaseous and vaporizable materials from said chamber along with the stripping medium.

3. Apparatus for removing gaseous or readily vaporizable materials from a liquid including, a treating chamber adapted to contain a liquid and having an inner shell and an outer shell concentrically disposed to provide an annular space therebetween, baffle means positioned between said shells defining a path of flow for a gaseous stripping medium and providing spaced apart surfaces along a substantial length of said chamber, an aperture in said inner shell for draining the liquid from a baffle surface into the interior of said inner shell to temporarily segregate said liquid out of contact with the medium, means for introducing a gaseous stripping medium at high velocity into the chamber, means for entraining in said stripping medium liquid contained within the inner shell, means for removing the gaseous and vaporizable materials from said chamber along with the stripping medium and means for separately removing treated liquid from said chamber.

4. Apparatus for removing gaseous or readily varopizable materials from a liquid including, a treating chamber adapted to contain a liquid and having an inner shell and an outer shell concentrically disposed to provide an annular space therebetween, a helical baffle positioned between said shells defining a helical path of flow for a gaseous stripping medium through the chamber in scouring contact with the liquid, an aperture in the inner shell for draining the liquid from a baffle surface into the interior of the inner shell to temporarily segregate said liquid out of contact with the medium, means for introducing a gaseous stripping medium at high velocity into said helical path for flow through the chamber in contact with liquid, means for entraining in said medium liquid contained within the inner shell, means for removing the gaseous and vaporizable materials from the chamber along with the stripping medium, and means for removing treated liquid from said chamber.

5. A process for removing gaseous or readily vaporizable materials from a liquid including, continuously supplying said liquid to one end of a confined path of flow and a gaseous stripping medium to the other end of said path, passing the liquid along the path alternately in finely divided form and in the form of films countercurrent to, and in intimate contact with, the flow of gaseous stripping medium, diverting the liquid from the path and from contact with the flow of said medium in a zone intermediate the ends of the path, atomizing and entraining the diverted liquid in the medium supplied to said other end of the path, causing a portion of the entrained liquid to be carried by the medium along the path of flow beyond said intermediate zone for further diversion and recycling, separating the portion of the entrained liquid which does not reach the intermediate zone from further contact with the medium, and removing the gaseous and vaporizable materials from the path along with the stripping medium.

6. A process for removing gaseous or readily vaporizable materials from a liquid including, continuously supplying the liquid to the upper end of a confined vertical helical path of flow and a gaseous stripping medium to the lower end of said path, passing the liquid downward along the path alternately in finely divided form and in the form of films, passing said medium at relatively high velocity upward along the path to cause scouring of the liquid films by the rapidly moving medium and to impart sufficient centrifugal force to the finely divided liquid to deposit said finely divided liquid as films on the outer boundary surface of the helical path, diverting the liquid from the path of flow and from contact with the rapidly moving medium in a zone intermediate the upper and lower ends of the helical path, atomizing and entraining the diverted liquid in the medium entering the lower end of the path, thereby causing the diverted liquid to be carried upward along the helical path and to be deposited as films along the outer boundary surface of said path, again diverting and atomizing the portion of the diverted liquid deposited as films in and above said intermediate zone, separating the diverted liquid deposited as films below the intermediate zone from further contact with the medium, and removing the gaseous and vaporizable materials from the upper end of the helical path along with the gaseous stripping medium.

BRUCE D. MILLER.

REFERENCES CITED

The following references are of record in the file of this patent:

UNITED STATES PATENTS

| Number | Name | Date |
| --- | --- | --- |
| 841,674 | Dodge | Jan. 22, 1907 |
| 1,246,704 | Boeckem | Nov. 13, 1917 |
| 1,366,956 | Schneible | Feb. 1, 1921 |
| 1,395,463 | Wight | Nov. 1, 1921 |
| 1,800,724 | Elliott | Apr. 14, 1931 |
| 1,867,933 | Wilton | July 19, 1932 |
| 1,943,146 | Rust | Jan. 9, 1934 |
| 1,989,033 | Weir | Jan. 22, 1935 |
| 2,345,667 | Hachmuth | Apr. 4, 1944 |

FOREIGN PATENTS

| Number | Country | Date |
| --- | --- | --- |
| 299,075 | Great Britain | Oct. 22, 1928 |